May 9, 1939.                 H. ALRIQ                 2,157,977
        AUTOMATIC REGULATING DEVICE FOR CURRENT RECTIFYING APPARATUS
                          Filed June 25, 1936

INVENTOR
Hubert Alriq.
BY
HIS ATTORNEY

Patented May 9, 1939

2,157,977

UNITED STATES PATENT OFFICE 2,157,977

AUTOMATIC REGULATING DEVICE FOR CURRENT RECTIFYING APPARATUS

Hubert Alriq, Paris, France, assignor, by mesne assignments, to The Union Switch & Signal Company, Swissvale, Pa., a corporation of Pennsylvania Application June 25, 1936, Serial No. 87,203
In France December 4, 1935

10 Claims. (Cl. 175—363)

The present invention has for its object improvements in automatic regulating devices for the supply of electric apparatus by means of a current rectifier.

Various devices have already been proposed for achieving this result, but the effectiveness of such devices varies in accordance with the magnitude of the rectified current which is supplied. Such apparatus has an additional shortcoming in that it requires a different adjustment of certain of its parts depending upon whether or not the supply circuit supplies a floating battery.

The apparatus according to the present invention embodies, in contrast with the apparatus mentioned above, a certain number of advantages, as follows:

It permits obtaining a constant rectified voltage, even for considerable variations in the magnitude of the load current and the alternating supply voltage;

It permits the same regulation to be obtained regardless of the character of the supply circuit, and finally It permits obtaining a more or less considerable compensating action.

The improvement constituting the object of the invention is essentially characterized by the use, in an automatic regulating device comprising regulating elements of the saturation type, of an additional compensating element exerting an action which depends on variations in the supply voltage and variations in the saturation of the magnetic circuit of the regulating portion of the apparatus. Moreover, the variations in the supply voltage are transmitted by means of a particular device, which may, for example, be a device of the microphone type having a resistance which varies in accordance with the pressure on the microphone capsules, or including piezo-electric elements or the like.

The invention is applicable generally to the control of circuits having considerable voltage variations, and may be used, for instance, in the direct supply of telephone communicating circuits, thus avoiding the necessity for using secondary batteries. It may also be used for the supply of track circuits, signalling circuits, and generally for the control of electric machines, such as alternators, for example.

According to one form of the invention, the device is improved by the provision of a rectifier or of an independent continuous current source intended for supplying the compensating apparatus.

Figure 1:
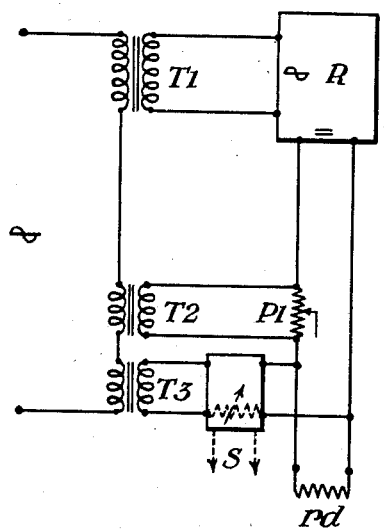
Figure 2:
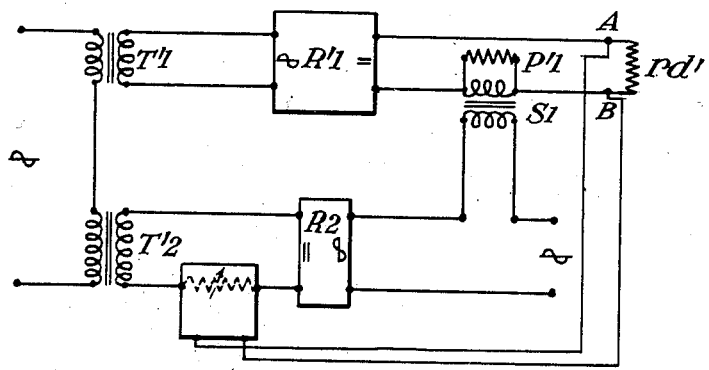

Fig. 1 of the attached drawing is a diagrammatic view showing one form of apparatus embodying my invention. Fig. 2 is a diagrammatic view showing a modified form of the apparatus of Fig. 1, and also embodying my invention.

In the form of apparatus according to Figure 1, a rectifier R is supplied with current from the alternating source by a transformer T1 and the output current supplied from the direct current terminals is controlled by means of a suitable magnetically saturated regulating device T2 of known type, the degree of saturation of which is controlled by means of a variable resistance P1.

The characteristic feature of the invention consists in the use of a compensating system T3 which may be supplemented by an auxiliary source S and which acts in such a manner as to avoid variations in the voltage supplied to the load circuit $rd$.

The compensating system T3 is composed essentially of two elements, a resistance element in which the resistance varies in accordance with the load voltage, and a saturation element comprising a magnetic circuit provided with saturation and compensation windings. The resistance element may take different suitable forms and may, for example, comprise microphone elements such as graphite discs on which a variable pressure is exerted by means of apparatus sensitive to variations in voltage. The effect may be magnified or augmented by means of a local source S. The resistance element may also comprise piezo-electric apparatus, potentiometer arrangements such as the Wheatstone bridge, vacuum or gas-filled electron tubes provided with control grids, differential relays, or any other suitable apparatus. The compensating windings could, if desired, be adapted to control the magnetic circuits of the device T2 directly, rather than the device T3. The rectifiers employed may be of any suitable type, and may, for instance, comprise vacuum or gas-filled electron tubes, electrolytic valves, dry rectifiers, or the like.

The operation of the apparatus shown in Figure 1 is, as regards T1 and T2, that of the usual magnetic regulating or saturating devices which are well known. The control effected by the device T2 is supplemented at any moment by the system T3 in the following manner: If the rectified voltage decreases and the saturation in the device T2 also decreases, the resistance of the system T3 will become less, causing in the saturating winding of T3, the circulation of a higher current than that which circulated before the decrease in the voltage occurred. This increased saturation in T3 will compensate for the decrease in the saturation in the magnetic circuit of T2. Conversely, when the rectified voltage increases, the intensity of the saturation in T3 will decrease, compensating for the excess of saturation in the magnetic circuit of T2. The actions described will be produced whether the variations in output voltage are caused by a variation in the rectified voltage due to the load or by a variation in the alternating supply voltage. The saturation feature alone will be involved if, for example, the current supplied increases as the alternating supply tension decreases.

The characteristics of the apparatus may be so selected that the rectified voltage will always be constant, notwithstanding variations in the voltage or current of the supply and load circuits.

Referring to Figure 2, the main rectifier R'1 is supplied with current from a transformer T'1 and the current supplied thereto is regulated by a compensating system T'2 which is supplemented by a saturable reactor S1 provided, in turn, with a regulating resistance P'1. The compensating system T'2 is energized from an auxiliary rectifier R2 and the load circuit is indicated at rd'.

Between the saturable reactor T'2 and the rectifier R2 is connected a non-linear resistance device similar to that shown in Fig. 1 which varies its resistance non-linearly with the voltage effective across the load terminals A—B so as to increase the effectiveness of the device with variations in the load voltage.

The operation of the apparatus of Fig. 2 is similar to that of Fig. 1 with the exception that the saturation element T'2 is not controlled directly by the load current but is controlled by current from the A. C. source through an auxiliary rectifier R2, such current being in turn controlled by the saturable reactor S1 and resistor P'1 which are responsive to load current variations. The load voltage which is effective at the terminals A and B of load rd' is applied to the variable resistance element described in conjunction with Fig. 1 and this element provides load voltage regulation, as in Fig. 1.

Having thus described my invention, what I claim is:

1. In combination, a source of alternating current, a rectifier having its input terminals energized from said source, a load supplied with current from the output terminals of said rectifier, a first saturable reactor connected between said source and said rectifier, a second saturable reactor having a control winding energized in accordance with the current supplied to said load and having an impedance winding, and means including said impedance winding and a source of alternating current for varying the saturation of said first saturable reactor to thereby vary the input to said rectifier in accordance with said load.

2. In combination, a source of alternating current, a rectifier having its input terminals energized from said source, a load supplied with current from the output terminals of said rectifier, a first saturable reactor responsive to the magnitude of the current supplied to said load, a device having a non-linear resistance characteristic, and a second saturable reactor magnetically independent of said first reactor controlled through said device and responsive in accordance with the voltage effective across said load, said two saturable reactors acting jointly to control the input to said rectifier from said source, said first saturable reactor acting to modify the saturation effect in said second saturable reactor.

3. In combination, a source of alternating current, a rectifier, a transformer having its input winding energized from said source and having its output winding connected across the input terminals of said rectifier, a load supplied with current from the output terminals of said rectifier, a first saturable reactor responsive to the magnitude of the current supplied to said load, and a second saturable reactor magnetically independent of said first reactor responsive in accordance with the voltage effective across said load, said two saturable reactors acting jointly to vary the impedance of the input circuit of said transformer to thereby control the input to said rectifier, said first saturable reactor acting to modify the saturation effect in said second saturable reactor.

4. In combination, a source of alternating current, a rectifier having its input terminals energized from said source, a load supplied with current from the output terminals of said rectifier, a first saturable reactor having a control winding energized in accordance with the current supplied to said load and having an impedance winding, a second saturable reactor connected between said source and said rectifier, an auxiliary rectifier; and means including a source of alternating current, said impedance winding, and said auxiliary rectifier for controlling the saturation of said second saturable reactor.

5. In combination, a source of alternating current, a rectifier having its input terminals energized from said source, a load supplied with current from the output terminals of said rectifier, a first saturable reactor having a control winding energized in accordance with the current supplied to said load and having an impedance winding, a second saturable reactor connected between said source and said rectifier, an auxiliary rectifier, a device having a non-linear resistance characteristic; and means including a source of alternating current, said impedance winding, said auxiliary rectifier, and said device for controlling the saturation of said second saturable reactor.

6. In combination, a source of alternating current, a rectifier, a transformer having its input winding energized from said source and having its output winding connected across the input terminals of said rectifier, a load supplied with current from the output terminals of said rectifier, a first saturable reactor having a control winding energized in accordance with the current supplied to said load and having an impedance winding, a second saturable reactor connected in the input circuit of said transformer, a device having a non-linear resistance characteristic; means including a source of alternating current, said impedance winding, and said device for controlling the saturation of said second saturable reactor; and means for governing the resistance value of said device in accordance with the voltage effective across said load.

7. In combination, a source of alternating current, a rectifier, a transformer having its input winding energized from said source and having its output winding connected across the input terminals of said rectifier, a load supplied with current from the output terminals of said rectifier, a first saturable reactor having a control winding energized in accordance with the current supplied to said load and having an impedance winding, a second saturable reactor connected in the input circuit of said transformer, a device having a non-linear resistance characteristic; means including a source of alternating current, said impedance winding, and said device for controlling the saturation of said second saturable reactor; and a circuit responsive in accordance with the voltage effective across said load for additionally controlling the saturation of said second saturable reactor.

8. In combination, a source of alternating current, a rectifier, a transformer having its input winding energized from said source and having its output winding connected across the input terminals of said rectifier, a load supplied with current from the output terminals of said rectifier, a first saturable reactor having a control winding energized in accordance with the current supplied to said load and having an impedance winding, a second saturable reactor connected in the input circuit of said transformer, an auxiliary rectifier; means including a source of alternating current, said impedance winding, and said auxiliary rectifier for controlling the saturation of said second saturable reactor; and means for additionally controlling the saturation of said second saturable reactor in accordance withe the voltage effective across said load.

9. In combination, a source of alternating current, a rectifier having its input terminals energized from said source, a load supplied with current from the output terminals of said rectifier, a first saturable reactor responsive to the magnitude of the current supplied to said load, a second saturable reactor responsive in accordance with the voltage effective across said load, and means governed by one of said reactors for modifying the saturation effect in the other of said reactors, whereby said two reactors are jointly effective to control the input to said rectifier from said source.

10. In combination, a source of alternating current, a rectifier having its input terminals energized from said source, a load supplied with current from the output terminals of said rectifier, two saturable reactors each connected with the circuit supplying current to said load and responsive respectively in accordance with the magnitude of the load current and the load voltage, the response of one of said reactors being accentuated by means of a device having a non-linear characteristic, and means governed by one of said reactors for modifying the saturation effect in the other of said reactors, whereby said two reactors are jointly effective to control the input to said rectifier from said source.

HUBERT ALRIQ.